US008386304B2

(12) United States Patent
Chen et al.

(10) Patent No.: US 8,386,304 B2
(45) Date of Patent: Feb. 26, 2013

(54) METHODS FOR INTERACTIVE TELEVISION AND MOBILE DEVICE

(75) Inventors: Yu Chen, Irvine, CA (US); Ramin Rahbari, Tustin, CA (US)

(73) Assignee: Yu Chen, Irvine, CA (US)

( * ) Notice: Subject to any disclaimer, the term of this patent is extended or adjusted under 35 U.S.C. 154(b) by 931 days.

(21) Appl. No.: 12/129,593

(22) Filed: May 29, 2008

(65) Prior Publication Data

US 2008/0300983 A1 Dec. 4, 2008

Related U.S. Application Data

(60) Provisional application No. 60/932,231, filed on May 29, 2007, provisional application No. 61/000,288, filed on Oct. 25, 2007.

(51) Int. Cl.
*G06Q 40/00* (2006.01)
(52) U.S. Cl. ............... 705/14; 705/26; 705/27; 725/46; 725/47; 725/39
(58) Field of Classification Search ............... 705/14, 705/26, 27; 725/39, 46, 47
See application file for complete search history.

(56) References Cited

U.S. PATENT DOCUMENTS

| | | | |
|---|---|---|---|
| 5,960,411 A * | 9/1999 | Hartman et al. | 705/26.81 |
| 6,493,872 B1 | 12/2002 | Rangan et al. | |
| 6,574,793 B1 | 6/2003 | Ngo | |
| 6,771,644 B1 | 8/2004 | Brassil et al. | |
| 6,799,326 B2 | 9/2004 | Boylan, III et al. | |
| 6,918,132 B2 | 7/2005 | Gargi | |
| 6,978,470 B2 | 12/2005 | Swix et al. | |
| 7,133,051 B2 | 11/2006 | Sloo et al. | |
| 7,134,132 B1 | 11/2006 | Ngo | |
| 2002/0053084 A1 * | 5/2002 | Escobar et al. | 725/47 |

OTHER PUBLICATIONS

"Japan: a future mobile society? Today's Japanese applications may be worldwide successes tomorrow", Stephen McClelland, Telecommunications Americas, v39, n8, p22(3), Jul. 2005, ISSN: 1534-956X. Retrieved from Dialog.*

* cited by examiner

*Primary Examiner* — Hai Tran
(74) *Attorney, Agent, or Firm* — Anthony King; Ardent Law Group, P.C.

(57) ABSTRACT

A environment of server and client systems for revenue generation, where a component is provided for broadcasters to broadcast and/or transmit programming, and where advertisers can create advertisement, and bid for advertising time on the transmitted programming. Advertisers are empowered by the network's ability to perform targeted advertising and/or product placement base on viewer attribute, programming content, and other criteria collected by the environment. Broadcasters are empowered by the network's ability to produce relatively high conversion rate using an viewer interface allowing enabling viewers to perform click-to-buy, click-to-send-lead, and/or click-to-send information, without much disruption to viewing of the transmitted programming. Also disclosed is a business method of generating revenue by utilizing an environment of server and client systems for targeted advertising and/or product placement, where incentives are created by and for broadcasters, advertisers, content providers, creator of the environment, and viewers.

26 Claims, 3 Drawing Sheets

METHODS FOR INTERACTIVE TELEVISION AND MOBILE DEVICE

CROSS-REFERENCE TO RELATED APPLICATIONS

This application claims priority to U.S. Provisional Pat. Nos. 60/932,231 filed on May 29, 2007, and 61/000,288 filed on Oct. 25, 2007, both of which are hereby incorporated by reference in their entireties.

Although incorporated by reference in its entirety, no arguments or disclaimers made in those provisional applications apply to this non-provisional application. Any disclaimer that may have occurred in the disclosure of the above-referenced applications is hereby expressly rescinded.

BACKGROUND OF THE INVENTION (1) Field of the Invention

The field of the invention is business model relating to interactive advertising and layered revenue generation.

(2) Description of Related Art Including Information Disclosed Under 37 CFR 1.97 and 1.98

Generally known methods of advertising involve increased periodic exposure of a message to consumers, or punctuated exposure of a message to consumers. This types of "branding" a product is affective to a certain extend, and has a relatively low conversion rate (a rate of converting to actual sales). Also known are methods to target advertising to specific consumer groups based on previously collected data and contact information of certain consumer groups; an example is the use of mailing lists of a specific type of consumers. Although it is an improvement, conversion rate is still relatively low. As for advertising on the Internet, there have been efforts to target banner ads to viewers based on keywords in the content of the web page being viewed by viewers. These types of internet advertising also suffers from relatively low conversion rate, because consumers are directed to an advertiser's webpage where the consumer goes through typical e-commerce mechanism to learn about the product and place order. Many potential purchasers are lost at the stage when they browse through the various web pages regarding the product. Thus, currently known internet advertising methods also suffers from relatively low conversion rate.

Also, interactivity provided on televisions, cable set-top boxes and digital video recorders has been relatively limiting. Channel selecting, picture-in-picture, program guide are the closest implementation of interactivity between a viewer and a machine when viewing and using a television monitor. And, advertising on video programs shown on televisions, mobile devices, and PCs is hardly targeted and mostly a one-way communication more effective as a "branding" tool. Examples of these can be found in U.S. Patent Application Publication No. 20020053084 and U.S. Pat. No. 6,574,793, both of which are incorporated herein by reference in their entirety. Again, conversion rate is relatively low because potential purchaser is required to go through considerable follow-up steps to make the purchase, and the desire to buy is often diminished during the follow-up steps.

For example, to respond to an advertisement shown on a television monitor, viewers are limited to making self-initiated follow-up with the advertiser using the contact information provided in the advertisement as shown. To respond to an advertisement shown over the internet, viewers are typically led to another website, where the viewer can receive additional information on the product and ways to order the product.

There is a continuing need for new ways to advertise, new ways to make advertising space available, new ways to respond to an ad, new methods of revenue stream generation, and new ways to increase efficiency in advertising.

All referenced patents, applications and literatures are incorporated herein by reference in their entirety. Furthermore, where a definition or use of a term in a reference, which is incorporated by reference herein is inconsistent or contrary to the definition of that term provided herein, the definition of that term provided herein applies and the definition of that term in the reference does not apply. The invention may seek to satisfy one or more of the above-mentioned desire. Although the present invention may obviate one or more of the above-mentioned desires, it should be understood that some aspects of the invention might not necessarily obviate them.

BRIEF SUMMARY OF THE INVENTION

Among the many different possibilities contemplated, a method of improve conversion rate is disclosed herein where mechanism allows a viewer to perform click-to-buy and/or click-to-send lead commands in response to a targeted advertising.

Sending a request in response to an advertisement is disclosed to comprise, under control of a client system, displaying the advertisement; and, in response to a single or a few actions being performed, sending the request along with an identifier of a viewer of the advertisement to a server system. It is contemplated that, under control of a command single or a few action request-sending component of the server system, the method further includes receiving the request, and retrieving additional information previously stored for the viewer identified by the identifier in the received request. It is further contemplated that the method includes sending the additional information to an advertiser to follow up with the viewer.

It is further contemplated that the displaying of an advertisement includes displaying an advertisement in association with a transmission to the viewer that is being viewed over a network. Further, it is contemplated that the network can be the Internet, a satellite network, a cable television network, a cellular phone network, a mobile communication network, or any other network where programming can be transmitted for viewing.

Contemplated transmission can be a broadcasted video program, a broadcasted live program, a broadcasted sporting events program, a streamed video program, a third party video advertisement; a user-generated content, a website, a user profile in a social networking website, a video game, an instant messaging user interface, a text message on a mobile device, and an e-mail message on a mobile device. Contemplated transmission can also be any other types of electronic transmission of information with a mass viewership, for example, a broadcasting network at a university, a broadcasting network at a government agency, a broadcasting network at a place of employment.

In preferred embodiments the single or a few actions includes one of the following: clicking of a mouse, pressing of a key, pressing of a button on a keyboard, a remote control, or any input device. In a preferred embodiment of the present invention, a viewer of the client system does not need to explicitly identify themselves when sending a request by a single or a few actions. Contemplated request can be a lead, a request to forward the advertisement, a request to save the advertisement, or a request to display additional information.

Among the many possible embodiments contemplated, it is preferred that the request is an order to purchase a requested item. In such case, the method further includes the steps of relaying the order to an advertiser, and relaying the retrieved additional information of the viewer to the advertiser so as to fulfill the order to complete purchase of the item.

In still further preferred embodiments, and depending on the device the electronic transmission is displayed on, a contemplated advertisement can be an overplayed or displayed banner, window, text message, or a combination of any of these possible types of advertisements.

Another aspect of the invention is directed to server system that makes available advertising space. In a preferred embodiment, the server system has a broadcasting component, an advertising component to allow precision advertising, a request-sending component that includes a data storage medium storing information for a plurality of viewers, a receiving component for receiving requests-to-send-a-lead or request-to-order an item. Contemplated request can include an indication of a viewer. Preferably, the request is sent in response to a single or a few actions being performed, and preferably the request is sent by a client system.

Contemplated server system can include a relaying component that retrieves information from the data storage medium for the indicated viewer, and relays the request and the retrieved information to an advertiser for the indicated viewer.

Contemplated broadcasting component can allow broadcaster to sign up and create his own broadcasting channel. It is further contemplated that a relatively simplified user interface is especially preferred so that setting up a broadcasting channel is relatively easy.

Further, the advertising component preferably allows the advertiser to bid for an advertising time slot in association with an electronic transmission, or a programming.

In one preferred aspect of the invention, the server system can have a linking component that links an advertisement with the content of a transmission being transmitted to viewers. The linking component preferably uses at least one of the following to perform linking: program content (e.g., meta data or other embedded data, content attribute), key words in the transmission, and viewer attributes.

Contemplated transmission can be a broadcasted video program, a broadcasted live program, a broadcasted sporting events program, a streamed video program, a third party video advertisement; a user-generated content, a website, a user profile in a social networking website, a video game, an instant messaging user interface, a text message on a mobile device, an e-mail message on a mobile device, or a electronic display in a virtual reality world (e.g., Second Life). Also contemplated are any programming or transmissions that can be received and/or displayed by a television monitor, a computer, a mobile device, a cellular phone, a PDA, an IPOD®, a MP3 player, an internet-enabled device, or a video game playing device.

Another aspect of the instant invention is a novel and interactive method to order an item using a client system, the method includes the steps of displaying an advertisement identifying an item and displaying an indication of a single or a few actions that is to be performed to order the identified item. Such action(s) can be a click of a mouse, a press of a button, a press of a key, etc. In one embodiment, in response to only the indicated command, the method includes sending to a server system a request to order the identified item.

Further, the novel method preferably includes the step of relaying the request to order the identified item to the advertiser along with an identifier to identify additional information needed to fulfill a purchase order. The identifier preferably identifies the client system and the server system provides the identifier to the advertiser.

Another aspect of the invention is a novel and interactive method to generate an instant lead regarding the product or service being advertised. The method includes the steps of displaying an advertisement identifying a product or service and displaying an indication of a single or a few actions that is to be performed to send viewer's interest in the product or service being advertised to appropriate parties, including the advertisers (e.g., Ford Motor Company), third party vendors (e.g., local Fords dealers who did not place the advertisement regarding Ford vehicles, whereas the advertisement was placed by the Ford Motor Company), the viewer himself (so that he can save the information and review it later), or a third-party such as a person in viewer's online address book (e.g., when the viewer want to share the information with friends).

Preferably, the client system and server system communicate via the Internet. Less preferably, the client system and server system communicate via a satellite network. Even less preferably, the client system and server system communicate via a cable network.

When an order is placed, or when a request is received, the method can include a step to send from the server system, or from the advertiser, an acknowledgement of receipt. For example, a text message can be sent to the viewer's cellular phone stating that the order was received and being processed.

A further aspect of the invention is a novel method of generating revenue. A preferred method includes providing a component for a broadcaster to create his own broadcasting channel, wherein the component allows for precision advertising. Also, the component allows advertisers to create and/or place their own advertisements and bid for air time on the broadcasting channel. Preferably, the component allows the broadcaster to generate revenue by collecting advertising income from advertisers.

Contemplated component can also allow an advertiser to generate revenue by collecting leads; for example, an advertiser can re-sell consumer responses it collected as a result of the advertisement.

Contemplated component can also allow an operator of the component to receive revenue from the broadcaster, advertiser, or both. In addition, subscription fees can be required to view the broadcasting channel.

Preferably, when the viewer responds to an advertisement, the method includes that step to automatically charge the viewer his credit card, debit card, user account, mobile device account, cable/satellite program account, IPTV account, membership account, or ISP service account.

Furthermore, contemplated method includes allowing a viewer to respond to the advertisement by a single or a few actions, such that a server subsequently relays the response to the advertiser along with additional information of the viewer previously stored at the server.

Various objects, features, aspects and advantages of the present invention will become more apparent from the following detailed description of preferred embodiments of the invention, along with the accompanying drawings in which like numerals represent like components.

DETAILED DESCRIPTION OF THE INVENTION

Figure 1:
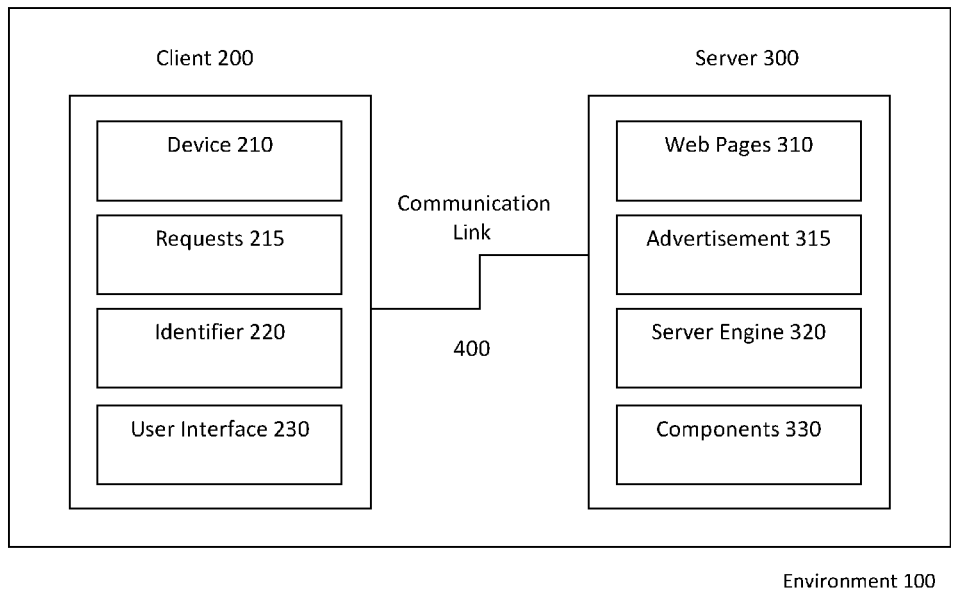
FIG. 1 is a block diagram of the server system and the client system in the contemplated inventive subject matter.

The invention and its various embodiments can now be better understood by turning to the following detailed description of the preferred embodiments, which are presented as illustrated examples of the invention defined in the claims. It is expressly understood that the invention as defined by the claims may be broader than the illustrated embodiments described below.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed herein even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims therefore include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

The contemplated invention creates a novel environment that involves at least a server system, a client system, a component, a user interface, a website, and various functional components. For ease of illustration, throughout this specification, this novel environment is referred to as environment X, and the plurality of functional elements involved with environment X are referred to as component X, user interface X, web pages X, server X, and client X. They may also be interchangeably referred to by part numbers: environment 100, component 330, user interface 230, web pages 310, server 300, and client 200.

As used herein, the term "broadcaster" refers to an entity, whether a natural person or a corporate entity that manages what is to be broadcasted, and when broadcasting of an electronic transmission is to take place for a viewing audience. The content of the transmission may derive from sources other than the broadcaster itself. It should be noted that a broadcaster as defined herein is not depended on who performs that actual broadcasting act, but is defined as the entity that manages what is to be broadcasted, and/or when broadcasting of an electronic transmission is to take place for a viewing audience. For example, a fourteen-year old teenager may register on the contemplated website X (with or without a fee) as disclosed in the instant application, and becomes a broadcaster, operating an IPTV channel on the Internet showing user-generated contents. This young broadcaster uses component X to manage and broadcast programs, thus technically server system X does the actual broadcasting, and not the fourteen-year old teenager sitting at home in front of his personal computer. But the fourteen-year old is considered the broadcaster, and not server system X. This young broadcaster may choose to allow members of the public to upload user-generated contents (UGC) into his channel for broadcasting (with or without a fee). This young broadcaster may further refine his channel using component X by censoring or limiting his programming to a specific type of programs. In preferred embodiments of the invention, the component allows this young broadcaster to manage broadcasting, scheduling, file uploading, and fee-charging. Other examples of a broadcaster may include established broadcasting companies that currently operate television channels, radio stations/channels, satellite radio stations/channels, cable channels, or other types of programming channels such as IPTV channels.

As used herein, the term "advertiser" refers to an entity, whether a natural person or a corporate entity, that places an advertisement in environment X 100. There may be various different reasons for placing an advertisement, for example, to sell a product, to inform the viewer of certain information, to solicit responses, etc. An example of an advertiser in the instant invention can be the owner of a local pizzeria. In one preferred embodiment, the owner of the pizzeria can register on the contemplated website X (with or without a fee), and use a relatively easy interface X to create an advertisement (with a fee) for pizza, and choose to target college-aged viewers within a specific geographical region who is likely to watch a specific sports programming. The contemplated component X matches the pizzeria owner's need with the most compatible channel and program so that the pizzeria owner's value in advertising is maximized.

As used herein, the term "advertisement" refers to a display of information, whether by audio, visual, or other ways to display the information. There may be various different purposes of an advertisement, for example, to sell a product, to inform the viewer of certain information, to solicit responses, etc. The advertisement as discussed in this application is not a printed advertisement. The advertisement as discussed herein can be a video advertisement. One example of advertisement can simply be a banner displayed on a monitor, an overplayed banner and/or panel, or a short text message displayed on the screen of a mobile device.

As used herein, the term "viewer" refers to a natural person that is the recipient/viewing audience of the advertisement. Basically, a viewer is a member of the consuming public that is viewing a "space" that is capable of displaying an advertisement. This "space" can be any types of media that currently has made advertising space available, or any future types of media, not contemplated now to be possible of placing advertisements, but will be in the future. For example, the viewer is someone who is viewing a transmission which can be a broadcasted video program, a broadcasted live program, a broadcasted sporting events program, a streamed video program, a third party video advertisement; a user-generated content, a video podcast, a blog entry, a webpage, a user profile in a social networking website, a video game, a massive multi-player online gaming environment (MMOG), an instant messaging user interface, a text message on a mobile device, an e-mail message on a mobile device, a programming being viewed on a mobile device, a virtual reality environment such the Second Life.

As used herein, the term "mobile device" refers to a portable electronic device that is capable of performing at least one of the following tasks: make/receive a telephone call, send/receive a text message, receive an image, send/receive instant messages, receive and display a video programming, browse the Internet, watch televised programs, watch satellite transmitted programs, play video game over a network, download/play portable files of pre-recorded video programs, download/play podcasts, and download/play e-books. Based on these capabilities, a mobile device can include, but not limited to, a cellular phone, a satellite phone, a Personal Data Assistant (PDA), a Blackberry®, an iPhone®, an IPOD®, an ITouch®, a MP3 Player, a MP4 player, a portable television, a laptop, a notebook computer, a digital media player, or any other portable devices for communication and/or entertainment.

The General Concept

The inventors have discovered a way to create a novel environment 100 that empowers advertisers 1500, broadcasters 1600, content providers 1700, creator 1300 of environment X, and viewers 1200, to enrich the objectives of these parties, and to maximize values for the parties involved in this novel environment 100.

The novel environment X enriches the objectives of relevant parties by providing a revenue stream model that encourages self-broadcasting, self-publishing, self-advertising, product placement, self-bidding for advertising space, all of which further provides incentives for proliferation of environment X.

One easy way to understand this novel environment X is by first recognizing some of the advantages made available to each parties involved in the novel environment X.

From A Viewer's Perspective

Example 1

A Television Viewer

A viewer watches Sunday morning television program on real estate listings. This television program showcases listings of houses for sale in city Y. He sees a banner ad for mortgage at the bottom of the screen. He presses a button on the remote control, and after a few optional confirmation steps on the screen, he continues to watch the television program. Meanwhile, Component X sends a lead to the advertiser (click-to-send-lead), and the advertiser will follow up with the viewer. In one contemplated embodiment, the lead is collected by an advertiser, and then the advertiser re-sells these leads to other vendor. These vendors then follow up with the viewer.

In one variation, the viewer presses a button, and after a few optional confirmation steps on the screen, information about the mortgage is emailed to the viewer, or forwarded to one of the viewer's friend (click-to-forward-info).

He continues watching the real estate listing television program. When a new listing which has a swimming pool appears, an overlayerd panel ad appears. The ad reads, "BOBBY'S POOL MAINTENANCE SERVICES. Most dedicated swimming pool cleaner in Smallville, family owned and operated. Click here and we'll contact you with our best price." In one contemplated embodiment, component X targeted this ad to this viewer, because based on viewer attribute, this viewer has a swimming pool and lives in Smallville. In another contemplated embodiment, component X linked this ad to this listing, because based on video content attribute, this listing has a swimming pool. He clicks on the ad, and a lead is send by component X to Bobby's Pool Maintenance Services to follow up with the viewer. (Click-to-send-lead.) The viewer continue watching the television programming without much interruption to write down contact information for the pool service, and the viewer is not led to read a website on Bobby's Pool Maintenance Services.

Example 2

A Viewer Making a Money Payment

A viewer watches a special Earthquake Relief programming on his mobile device. Some time during the programming, a pop-up window shows up on the side of the screen. The pop-up windows says "to donate to the Red Cross, press *5." The viewer wants to donate to Earthquake Relief; she presses *5 on her mobile device, all the while the programming is still ongoing. Without being directed to the Red Cross website or directed to fill out a donation form, or directed to call a Red Cross representative, the viewer follows through a few simple confirmations steps, such as "type in the amount you want to donate." After those confirmation steps, she continues watching the programming. Shortly thereafter, the viewer receives a text message confirming that a donation was made based on her payment preference profile on file with her mobile device account. Based on the previously-set information on her mobile device account, the donation amount was directly charged to her credit card. Alternatively, the donation amount can be charged to her account with the mobile device, so that the donation amount will show up on her next mobile device monthly invoice.

Example 3

A Viewer Making a Purchase

A viewer 1200 using a laptop computer watches an internet broadcasting channel, a programming regarding travel. A banner appears and indicates "Buy this pair of Nike® trekking shoes, your size, $75 from Macy's®." The viewer recognizes it as a bargain, uses the mouse to click on a buy button. Optionally, the viewer engages in a few more confirmation steps on the computer. Optionally, the viewer did not have to fill out an on-line form or enter into his shoe size, because his viewer attribute already has that information (along with other information, such as his shirt size). The banner disappears and he continues watching the travel programming. The viewer was not re-directed to another website, and the purchase order was placed with relative ease. Within a short moment the viewer receives a text message on his cellular phone confirming the purchase.

From An Advertiser's Perspective

Example 4

A Local Pizzeria as the Advertiser

It is understandable that a local pizzeria would not want to advertise to an audience that is located outside of its intended geographic region to which it delivers pizza. It would also be helpful for the local pizzeria to target its advertisement to an audience group that is more likely to purchase pizza. Further, it is more advantageous if the advertisement for pizzeria is exposed to the intended audience at a time when the audience is more likely to want to eat pizza. Currently, a local pizzeria may choose to send out paper flyers, or place television advertisements in local community cable channel programming. It may also place on-line advertisements with Google Ad to specifically target computer users within a certain number of miles around a postal zip code, using keywords so that when a computer user searches for one of the key words, the Google Ad advertisement is triggered and displayed on that computer user's monitor.

In one preferred embodiment, the owner of the pizzeria is able to place targeted advertisement in a relatively cost-effective and relatively efficient way. The owner simply visits website X of novel environment X, registers as an advertiser, and uses a relatively easy interface X to create an advertisement for pizza. He may chose to create words-only ads, or he may chose to include an eye-catching graphic/icon provided by the website. He can also choose to target college-aged viewers who are not vegetarians living within a specific geographical region (viewer attributes will help filter out vegetarians). In one preferred embodiment, the website also allows him to target those who will be watching the 8:00 PM college football game on channel 54. Here, the owner's value in spending advertising money is maximized.

In one variation, environment X also allows him to have his ad displayed on the television screen as a pop-up bubble to the targeted audience whenever there's a "touchdown" in the 8:00 PM football game on channel 54.

In another variation, the environment X also allows him to have his ad displayed on the computer monitor as a running banner to the targeted viewers whenever (between the hours of 5:00 PM to 10:00 PM) that viewer is watching an online programming channel on the computer where the content of the programming relates to food, football game, or Italy.

In yet another variation, the environment X allows him to have his ad displayed on the mobile device screen of those viewers watching the 8:00 PM football game on the mobile device, where these viewers are physically located within his delivery area (e.g., information on cellular towers used by these mobile devices will help filter out viewers who are outside of the delivery area).

Example 5

Major National Pet Supply Store ACME, as the Advertiser

ACME decides to place ads to target viewers in seven major U.S. cities while they watch the top three funniest animal clips having the highest hits on a website/web channel that shows user generated contents (e.g., www.youtube.com). ACME visits website X which has component X for placing advertisement on that web channel. ACME places bids against other bidders (other advertisers) using component X to bid for advertising time and space on the top three funniest animal clips for the entire month of November. ACME wins. When a viewer watches one of the top three funniest animal clips during the month of November, an ACME overlaying banner ad shows up.

From A Broadcaster's Perspective

Example 6

An Inspiring Young Entrepreneur as a Start-Up Broadcaster

A young college student studying in film school looks for a place to showcase his own short films and documentaries. For ease of reference, this student is herein referred to as Johnny. Johnny visits website X, and registers as a broadcaster so he now manages a programming "channel" on component X provided by environment X. On his channel he may broadcast his works, and he may allow public viewing of those works. Johnny may also charge people subscription fees or pay-per-view fees to watch his works. Johnny essentially has crated his own television channel, broadcasting his own programming.

In one contemplated embodiment, Johnny can use component X to manage timing and frequency of his programming.

In one contemplated embodiment, Johnny can use component X to see attributes of each of his programming. For example, number of hits, demographics of viewers.

In another contemplated embodiment, Johnny may not see attributes of his viewers, and those attributes are accessible only the creator of environment X.

In one contemplated embodiment, Johnny can use component X to offer advertising space to advertisers. For example component X can allow bidders to bid for advertising space on Johnny's most popular documentary.

In one contemplated embodiment, Johnny can generate revenue by selling/leasing advertising space.

In another variation, component X allows viewers to upload user-generated-content (UGC) undo Johnny's channel. Johnny's channel now broadcasts UGC, and Johnny sells advertising space on these UGC. Naturally, the most popular UGCs are more profitable for Johnny. Johnny may use component X to share profit with the person who uploaded that particularly profitable UGC. This in essence creates a partnership between Johnny and UGC providers to make advertising space more valuable/profitable to them, and to the advertisers.

Example 7

An Established Broadcaster

XYZ is a well-known national broadcasting company operating television stations and cable channels, satellite television stations, and also internet television stations. XYZ also makes their popular TV shows available to the public on a website, so that a viewer may watch it online (e.g., via streamed video). XYZ's programs may be self-produced programs, or they may come from other content providers.

Traditionally, XYZ offers advertising space to advertisers. And traditionally, advertisers can decide when they want their ads to appear, and during which TV show. The objective for the advertisers is to create repeated exposure to capture viewer attention.

Now, XYZ may use environment X's novel technology to enhance advertising revenue generation. XYZ implements environment X, and offers target advertising to greatly improve the level of relevancy in the advertisement to each viewers. With increased advertisement relevancy, advertisers expect to improve precision of targeting viewers and to improve conversion rate. Also, XYZ can now charge a higher advertising rate.

In one contemplated embodiment, XYZ charges a much higher advertising rate for a breakfast cereal company (e.g., Kellogg's®) to advertise their ad whenever someone mentions cereal in a segment of XYZ's program, or whenever a breakfast cereal box appears in a scene of a movie.

In one contemplated embodiment, the ad can be a pop-up box on the screen, noting "Kellogg's® Whole Grain Cereal is the leading breakfast cereal in nutrients! Click here to place it in your shopping cart." The cereal boxes in the movie may have nothing to do with Kellogg's® brand cereal. Environment X empowers the advertisers by using contents in this movie to reinforce advertising message. Here, environment X essentially creates a product placement-type of advertising. Here, the actual Kellogg's® Whole Grain Cereal need not be placed in the movie scene, and its message is reinforced by some random cereal box in the movie.

In one variation, component X processes the viewer's command when the viewer clicks on the box that says "Kellogg's® Whole Grain Cereal is the leading breakfast cereal in nutrients! Click here to place it in your shopping cart," such that this specific item is "placed" in his online shopping cart at his favorite local grocery store.

In one variation, component X processes the viewer's command when he clicks on the box that says "Kellogg's® Whole Grain Cereal is the leading breakfast cereal in nutrients! Click here to buy," such that a purchase order is placed and a vendor is instructed to ship the merchandise to the viewer based on viewer's address on file.

In another contemplated embodiment of environment X 100, Kellogg's® can choose to display the above pop-up box whenever a cereal box shows up in a scene, and only display such pop-up box to viewers who have children. This is made possible by component X utilizing viewer attribute provided by XYZ broadcasting company (or in another variation, viewer attribute is collected by stored by component X).

Advertisers 1500 are now empowered with a new level of making their ads relevant, and precisely reaching target audience. Advertisements are empowered with a new layer of exposure, because contents of the broadcasted program now supplement the advertising message. Broadcasters 1600 are empowered with increased value of advertising space.

From Content Provider's Perspective

Example 8

A Movie Producer

Product placement is a known advertising technique where an advertised product is mentioned or displayed in a scene of a movie. For example, a main character in a movie frequently drinks Pepsi® cola in the movie, and drives the newest BMW® sedan. Environment X allows a newer level of product placement. Movie producers can benefit from environment X, by embedding additional data in their movies so that when the movie is viewed in conjunction with environment X (e.g., on a DVD, online, on a cable channel, or on television via a set-top box), a overlaying ad banner for the new BMW® vehicle appears on the screen when the actual BMW® vehicle shows up in the movie. A viewer who is interested to know more about the new BMW® vehicle can click on the banner to see specifications of the car.

In another variation, when the movie is viewed in conjunction with environment X (e.g., online, on a cable channel, or on television via a set-top box), a overlaying ad banner for a local BMW® dealership appears on the screen when the actual BMW® vehicle shows up in the movie.

As a result, content providers 1700 are empowered with additional product placement ability, and can charge more for the added level of product placement.

From the Creator's Perspective

Example 9

Creator of Environment X

In one contemplated embodiment of the business model, the creator 1300 generates revenue by licensing the environment X technology to broadcasting companies which has pre-existing programming channels.

In one contemplated embodiment of the business model, the creator 1300 generates revenue by providing services and support to integrate environment X into a broadcasting company's existing infrastructure so as to enable some or all of the functions of environment X for the broadcasting company.

In one contemplated embodiment of the business model, the creator 1300 generates revenue by creating environment X and allows interactions between broadcasters 1600, advertisers 1500, viewers 1200, and content providers 1799 in environment X. In a further contemplated embodiment, the revenue comes from at least one of the following parties: broadcaster (paying monthly fees to set up a broadcasting channel), advertiser, and viewers (subscription fees).

Other Possible Examples

It should be noted that many other scenarios of interactions between the relevant parties within environment X are possible, based on the following criteria: types of media, types of media viewing device, types of mobile device, types of advertisement, types of broadcasters, types of advertisers, and types of viewers. As defined above, this disclosure specifically includes all permutations of those criteria, especially all permutations of the functions illustrated in the examples.

Further Description of the Inventive Subject Matter

Referring now FIG. 1, a server 300 communicates with a client system 200 via communication link 400. Server 300 sends web pages 310 and advertisement 315 to the client system 200, and has functional components collectively referred to as components 330. Among the many different possibilities contemplated, a method of sending a request 215 in response to an advertisement 315 is disclosed to comprise, under control of a client system 200, displaying the advertisement 315; and, in response to a command being performed by a viewer 1200, sending a request 215 (using user interface 230) along with an identifier 220 of a viewer 1200 of the advertisement 315 to the server system 300.

It is contemplated that, under control of a request-sending component 333 of the server system 300, the method further includes receiving the request 215, and retrieving additional information 334 previously stored regarding the viewer 200 identified by the identifier 220 in the received request 215. For example, a broadcaster 1600 collects basic information (e.g., name, address, payment method, phone number, E-mail address) regarding its subscribers (i.e., viewers) by asking relevant questions on its subscription form. Other methods of collecting information are known and are contemplated herein, such as those disclosed in U.S. Patent Application Publication 20070061838, which is herein incorporated by reference in its entirety. This additional information 334 can be any relevant information about the viewers 1200 that may help in categorizing viewers 1200 for target advertising. Cross-platform implementations of targeted advertising and other method and systems of targeted advertising is also contemplated, such as that disclosed in U.S. Patent Application Publication No. 20070100688 and U.S. Pat. No. 6,718,551, both of which are incorporated herein by reference in their entirety. Additional information 334 may be collected by any relevant parties in environment 100, and can be sold and exchanged within environment 100. Additional information 334 may also include viewing history, viewing habit, search terms previously used, words being used in instant messaging, and cellular phone network towers being used. It is further contemplated that the method includes sending relevant background information of the viewer 1200 to an advertiser 1500 to follow up with the viewer's request 215. Therefore, when a viewer 1200 is interested in an advertisement 315, and sends a request 215 to the server 300, the server 300 retrieves and send viewer's contact information to the advertiser 1500. The advertiser 1500 can now follow up with the viewer 1200.

Figure 2:
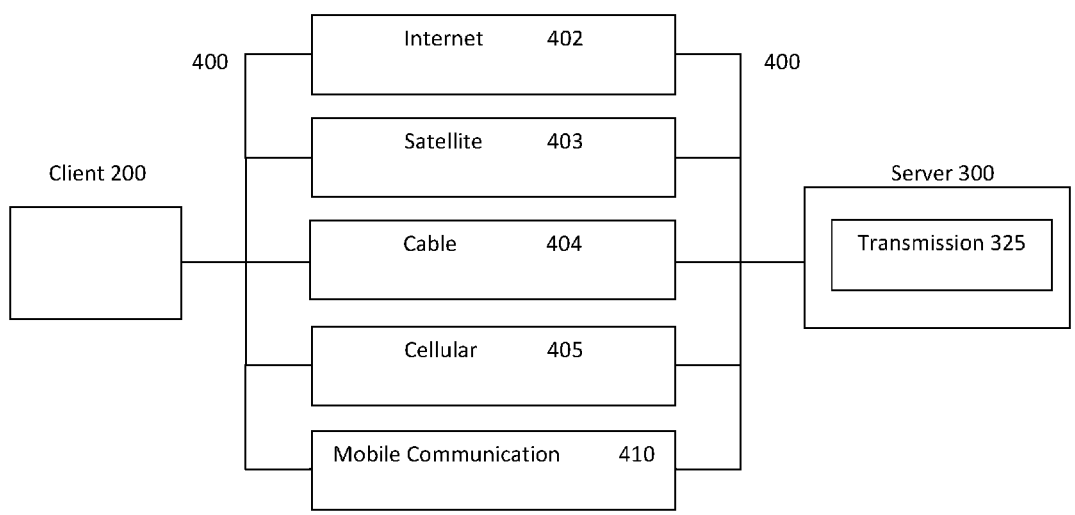
FIG. 2 is a block diagram showing the types of communication links between the server system and the client system in the contemplated inventive subject matter.

Referring now to FIG. 2, it is further contemplated that the displaying of an advertisement 315 includes displaying an advertisement 315 in association with a transmission 325 to the viewer that is being viewed over a network 400. Further, it is contemplated that the network 400 can be the Internet 402, a satellite network 403, a cable television network 404, a cellular phone network 405, a mobile communication network 406, or any other network where a transmission 325 can be transmitted for viewing. In addition, the contemplate method specifically includes using it in conjunction with a set-top box allowing viewers to watch programming available on the Internet from a television set (i.e., a typical TV-PC convergence scenario). The contemplated method also specifically includes using it in conjunction with IPTV systems, and IPTV system that allow users to upload their own video content (such as that disclosed in U.S. Patent Application Publication 20070157252, incorporated herein by reference in its entirety). It is to be noted, as discussed above, that the "transmission" 325 mentioned herein is not limited to a recorded video programming, it shall include any types of interaction a viewer has over a network (as defined above) controlled by a viewer interface 230 on a monitor or a screen of a electronic device. For example, the transmission 325 includes a instant messaging session where a viewer 1200 watching a monitor screen (or the screen of a PDA phone) interacts with another viewer 1200; advertising space is available during the instant messaging session, and methods of the herein-described technology can be used to link words or other contents in the instant messaging session with relevant advertisements 315, such that a viewer 1200 can perform click-to-send-lead and/or click-to-buy. Another example of "transmission" 325 includes a Mass Multi-Player Game played over the internet. A game player is considered a viewer 1200, and relevant advertisement 315 can be directed to the game player based on viewer attribute 640. In one preferred embodiment, viewer attribute is stored and managed by the broadcaster 1600. In less preferred embodiments, viewer attributes it stored and managed by the creator 1300 of environment X. Also, relevant advertisement can be displayed at appropriate time and location in the gaming environment based on contents of the game. One skilled in the art will immediately recognize that one of the key components in this invention is linking advertisement with contents of the "transmission," 325 and that the linking can be performed with all possible types of "transmissions" 325 currently available, and those unforeseeable new "transmissions" and media types that may be developed in the future.

Linking contents of the transmission 325 to an advertisement 315 can be done by the server system 300 in several ways. One way is by linking the advertisement to relevant pre-existing meta data or other identifying embedded codes in the transmission 325. Another way is by using key words in the transmission 325; another way is by linking the advertisement 315 to identifiable relevant audible sounds in the transmission (e.g., a Pet Supply Store advertisement can be displayed every time there's dog barking sound in the programming); another way is by using identification technology (when available) to identify specific items, words, persons, and link advertisement to them (e.g., a Coca-Cola® advertisement appears whenever a Coca-Cola® bottle shows up in a scene of a televised movie; an Elvis Collectible CD set advertisement is linked to every images of Elvis Presley shown in the programming; a cat food advertisement is shown to a viewer, whenever someone sends a photo text message of a cat to the viewer). In preferred embodiments, the command (to send request) performed by viewer 1200 may be a single or a few actions, which includes at least one of the following: clicking of a mouse, pressing of a key, a vocal command to a device, pressing of a button on a keyboard, a remote control, or any input device. In a preferred embodiment of the present invention, a viewer 1200 of the client system 200 does not need to explicitly identify themselves when sending a request by a single or a few actions. This greatly simplifies action necessary to respond to an advertisement, and is designed to increase conversion rate in advertising. Conventional advertisements require a viewer to follow up with the advertiser (e.g., call the advertiser, visit the advertiser's web page, fill out a form), such requirements are major reasons for low conversion rate in conventional advertising schemes. Examples of which are found in U.S. Pat. No. 6,574,793, which is incorporated herein by reference in its entirety.

Figure 3:
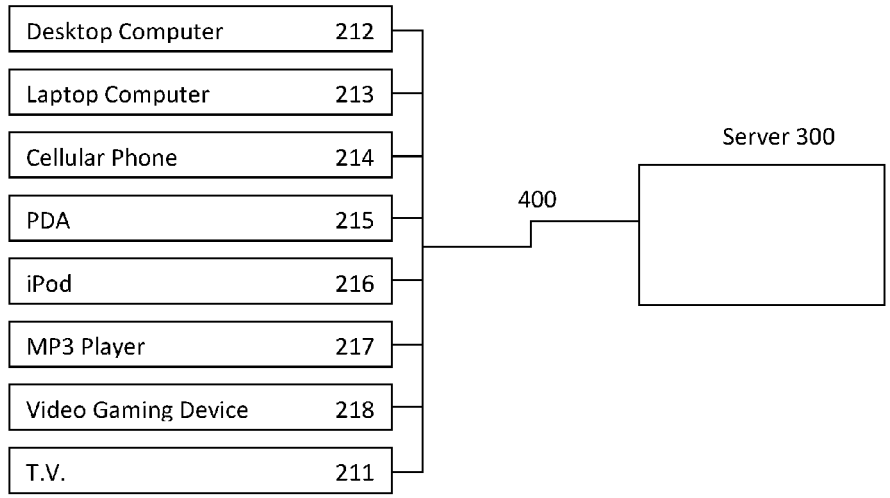
FIG. 3 is a block diagram showing the types of viewer devices in the contemplated inventive subject matter.

In a preferred embodiment, a viewer 1200 completes sending the request in no more than four steps, more preferably no more than three steps, even more preferably no more than two steps, most preferably no more than one step. Each of the steps can be a clicking of a mouse, pressing of a key, pressing of a button, keying in a page of information. For example, a viewer's response to each of the following prompt is considered a step:

Prompt: click here to buy this item
Prompt: click here to forward this item
Prompt: select the email addresses from the below list of the persons you want to forward this information to
Prompt: Please confirm whether this is your address
Prompt: press * to confirm that you wish to charge your credit card on file for this purchase
Prompt: which color would you like to purchase, select one from below
Prompt: please select topping for your pizza from the following list
Prompt: Your total is $21.50, click here to complete your pizza order Referring now to FIG. 3, client system 200 displays transmission 325 and advertisement 315 on a viewer device 210.

Contemplated viewer device includes a television 211, a desktop computer 212, a laptop computer 213, a cellular phone 214, a PDA 215, an IPOD® 216, a MP3 player 217, a video game playing device 218, and any other mobile device for viewing a transmission 325 on a network 400.

Figure 4:
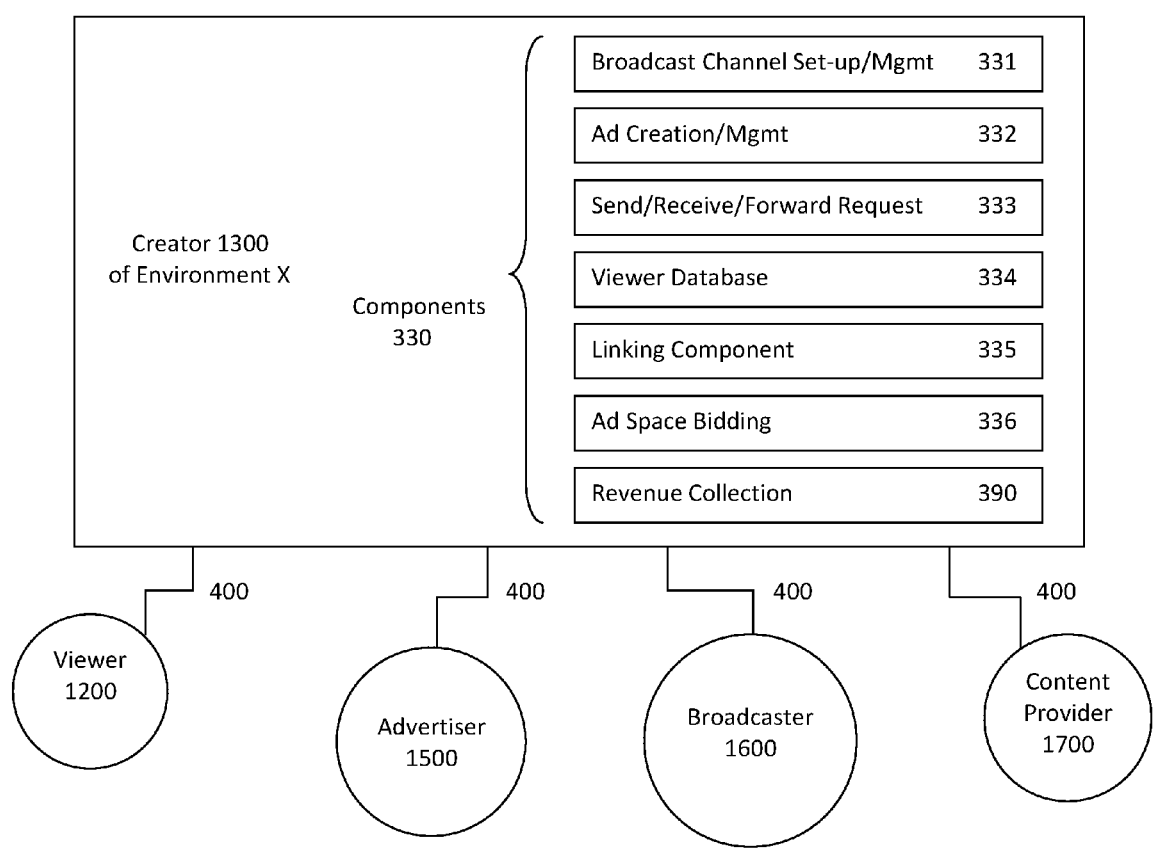
FIG. 4 is a block diagram illustrating the relevant entities in the novel environment created by the current invention, and some of the features/components offered by the server system, which is controlled and managed by the creator of the environment.

Referring now to FIG. 4, client system 200 sends request at the command of viewer 1200. Contemplated requests can be a lead, a request to buy, a request to forward the advertisement, a request to save the advertisement, or a request to display additional information. Among the many possible embodiments contemplated, it is preferred that the request is an order to purchase a requested item. In such case, the method further includes the steps of relaying the order to an advertiser by component 333 of server 300, and relaying the retrieved additional information of the viewer to the advertiser so as to fulfill the purchase order to complete purchase of the item. Sending a request is also referred to as click-to-send-lead and click-to-buy. These terms do not specifically limit viewer's response to a single click, but is meant to encompass a single click, or together with confirmation steps. Mechanism of sending requests using viewer identifier between a client system and a server system is known, such as those disclosed in U.S. Pat. No. 5,960,411, herein incorporated by reference in its entirety.

Other components 330 of the server system 300 preferably includes a broadcast channel set up/management 331, advertisement creation/management 332, send/receive/forward request 333, viewer database/attribute 334, linking component 335, advertising space bidding 336, and revenue collection 390. Note that any of these components can be optional for server system 300, and in less preferred embodiment, they can be available for broadcaster 1600, advertiser 1500, and content provider 1700.

With respect to advertisement 315, in still further preferred embodiments, and depending on the device the electronic transmission is displayed on, a contemplated advertisement 315 can be an overplayed or displayed banner, window, text message, or a combination of any of these possible types of advertisements. Other known types of advertisements are especially contemplated, such as those disclosed in U.S. Pat. Nos. 7,133,051 and 6,918,132 and 7,134,132 and 6,799,326 and 6,978,470 and 6,493,872, and U.S. Patent Application Publication No. 20040117819, all of which are incorporated herein by reference in their entirety. Optionally, the advertisement can be embedded in the contents of the transmission (e.g., an advertisement can be displayed on a digital billboard, where the billboard is a pre-existing component in an on-line game). Optionally, the transmission can be automatically paused by the client system X when the advertisement is shown. Methods of program insertion in real time IP multicast are particularly contemplated for inserting advertisement segments into a transmission, such as those described in U.S. Pat. Nos. 6,771,644 and 7,133,051, both of which are herein incorporated by reference in their entirety.

Another aspect of the invention is directed to server system 300 that makes available advertising space. In a preferred embodiment, the server system 300 has a broadcasting component 331, an advertising component 332 to allow precision advertising, a request-sending component 333, a data storage medium storing information for a plurality of viewers, a receiving component 333 for receiving requests-to-send-a-lead or request-to-order an item (or any other types of requests/commands). Preferably the request is sent by a client system.

Contemplated server system 300 can include a relaying component 333 that retrieves information from the data storage medium for the indicated viewer 1200, and relays the request 215 and the retrieved information to an advertiser for the indicated viewer 1200. The relaying component can be part of the client system 200, the server system 300, or both. It is preferred that the server system 300 has the relaying component 333.

Contemplated broadcasting component 331 can allow broadcaster to sign up and create his own broadcasting channel. It is further contemplated that a relatively simplified user interface on a website 310 is especially preferred so that setting up a broadcasting channel is relatively easy.

Further, the advertising component 331 preferably allows the advertiser 1500 to create an advertisement 315, to purchase advertising time and space. Preferably, advertisers 1500 may bid for an advertising time slot in association with a particular electronic transmission, the bidding is enabled by component 336. Bidding can be done over an interface, such as website 310.

In one preferred aspect of the invention, the server system can have a linking component 335 that links an advertisement with the content of a transmission being transmitted to viewers, as discussed above. The linking component 335 can be part of the client system 200, or more preferably, the server system 300, or both.

Another aspect of the instant invention is a novel and interactive method to order an item using a client system 200, the method includes the steps of displaying an advertisement 315 identifying an item and displaying an indication of a single or a few actions that is to be performed to order the identified item. Such action(s) can be a click of a mouse, a press of a button, a press of a key, etc. (as discuss above). In one embodiment, in response to a viewer command, the method includes sending to a server system a request to order the identified item. The command may be as simple as a single step of action to confirm purchase (e.g., the advertisement says "click here to buy."). The command may also require more than just a single step, such as confirmation steps to select size and color of the merchandise.

Further, the novel method preferably includes the step of relaying the "request to order the identified item" to the advertiser along with an identifier 220 to identify additional information needed to fulfill a purchase order. The identifier preferably identifies the client system 200, and the server system 300 provides viewer's contacting information to the advertiser 1500.

One skilled in the art will immediately recognize that another key component of the inventive subject matter is to provide a viewer the ability to save or forward information (e.g., this information can be an advertisement, or simply a portion of the transmission being viewed) to others or himself. One contemplated aspect of the invention is a novel and interactive method to generate an instant lead regarding the product or service being advertised. The method includes the steps of displaying an advertisement identifying a product or service and displaying an indication of a single or a few actions that is to be performed to send viewer's interest in the product or service being advertised to appropriate parties. The appropriate parties may include the advertiser (e.g., Ford Motor Company), third party vendors (e.g., local Fords dealers who did not place the advertisement regarding Ford vehicles, in a situation where the advertisement was placed by the Ford Motor Company), the viewer himself (so that he can save the information and review it later), or a third-party such as a person in viewer's online address book (e.g., when the viewer wants to share the information with friends).

Preferably, when an order is placed, or when a request is received, the method includes a step to send from the server system 300 (preferred), or from the advertiser, an acknowledgement of receipt. For example, a text message is sent to a viewer's cellular phone stating that the pizza delivery order was received and will be delivered to a specified address.

Figure 5:
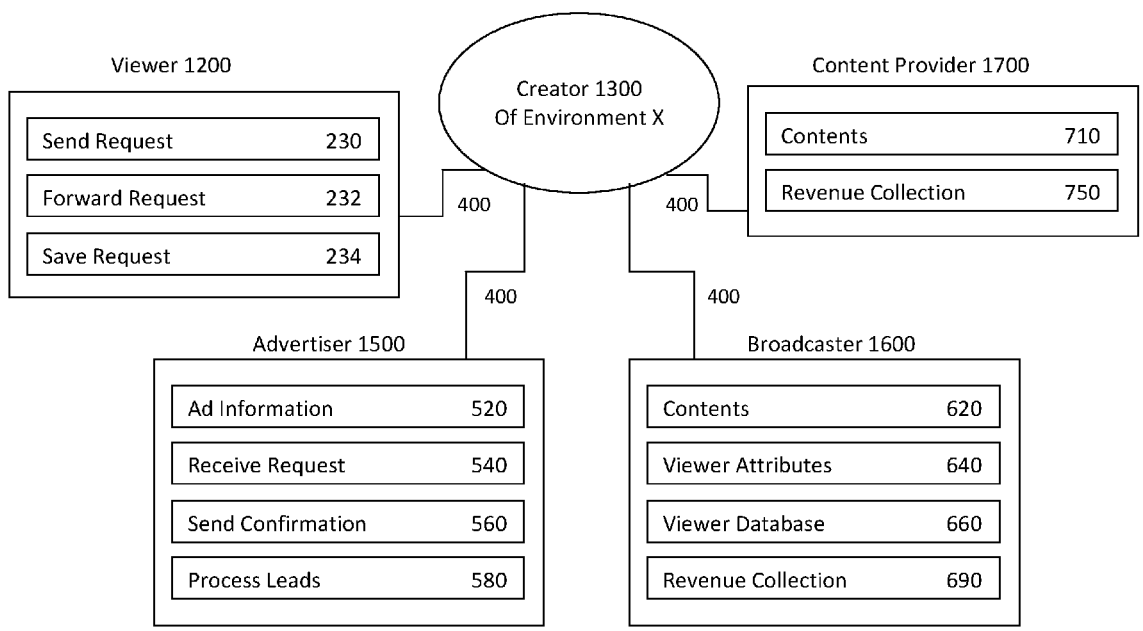
FIG. 5 is a block diagram illustrating the relevant entities in the novel environment created by the current invention, and some of the features/components available to the viewers, advertisers, broadcasters, and content providers.
Figure 6:
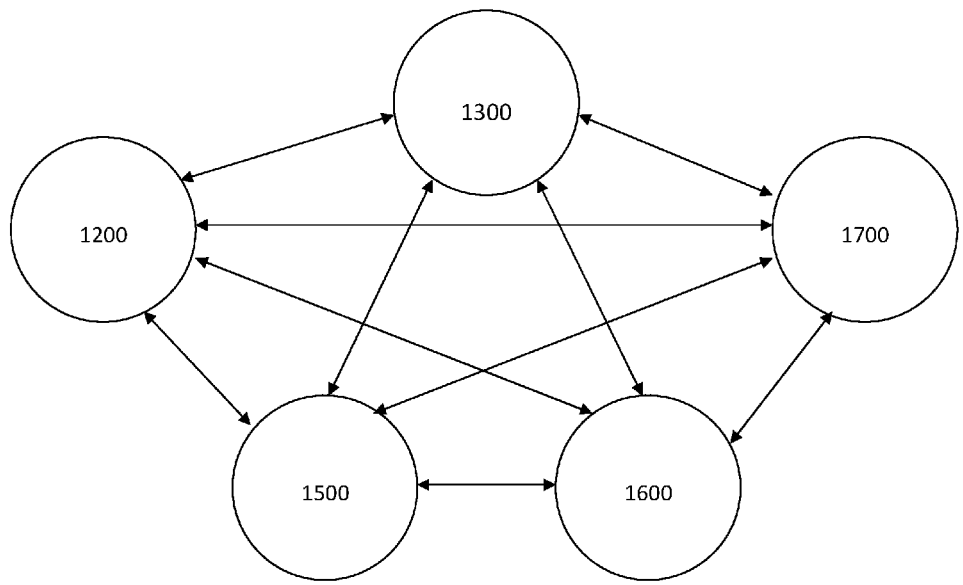
FIG. 6 is a block diagram illustrating the interactivities between relevant entities in the novel environment.

FIGS. 4 and 5 illustrate the interaction between creator 1300 of environment X with viewer 1200, advertiser 1500, broadcaster 1600, and content provider 1700. In the preferred embodiment, interaction between these parties is encouraged. FIG. 6 illustrates interactions made possible between these parties in environment 100. One of the practical utility of the invention is a novel method of generating revenue by solving the technical problem of making advertisement relevant to viewers, thus increase conversion rates. A preferred method includes providing a component 331 for a broadcaster 1600 to create his own broadcasting channel, wherein a linking component 335 allows for precision advertising. Also, components 332 and 336 allow advertisers to create and/or place their own advertisements and bid for air time on the broadcasting channel. Component 332 can have simplified user interface to help advertisers narrow down their audience group by using a series of questionnaires for advertisers to answer. Component 332 can also have advanced features for more experienced advertisers to manage and target audience. One skilled in the art can envision and implement other known features into the components 330; as such, additional details of components 330 can be immediately recognized by one skilled in the art. Preferably, the components 330 allow the broadcaster 1600 to generate revenue by collecting advertising income from advertisers. In a preferred embodiment, incentives (e.g., increased revenue income, increased viewer ship, increased partnership opportunities) are self-generated between advertisers 1500, broadcasters 1600, viewers, content provider 1700, and the creator 1300 of the environment 100. Self-generating incentives further proliferate growth of environment 100. Revenue generation are layered such that each party involved in environment 100 can have some kind of profit-sharing with another party, and each party's success depends on the success of another party. Interaction and communication between the parties can be done by commonly known communication methods over the network, or by traditional communication route.

Contemplated embodiment can also allow an advertiser to generate revenue by collecting leads; for example, an advertiser can re-sell consumer responses it collects as a result of its advertisement. Component 580 can optionally allow auctioning and bidding for these leads.

Creator 1300 of the environment 100 can receive revenue from the at least one of the following parties: broadcasters, advertisers, viewers, and content providers. Optionally, creator 1300 of environment 100 can receive revenue from a portion of the following proceeds: subscription fees, pay-per-view fees, winning bids, bidder's fees.

Preferably, when the viewer responds to an advertisement, the novel method includes a step to automatically charge the viewer based on his preferred payment method of payment. Contemplated payment methods include: credit card, debit card, third party fund transfer services (e.g., Paypal®, online banking electronic transfer) user account, mobile device account, cable/satellite program account, IPTV account, membership account, or ISP service account. For example, Website 310 shows a number of IPTV channels created by broadcasters 1600. Viewer B is a subscriber to one of the IPTV channels. Viewer B pays a subscription fee to the broadcasters (a portion of which may go to the creator 1300). Viewer B sees an advertisement banner during a video programming on the IPTV channel and decides to buy the merchandise. There can be a number of scenarios to pay, for example:

A. Viewer B watches the program via his PDA phone (on the AT&T® cellular network) that supports internet and IPTV capabilities. Based on his preferred setting, the charge for the merchandise will appear on his next AT&T® cellular phone invoice. Optionally, AT&T® can impose a service fee. Also optionally, AT&T® can offer a discount to encourage viewers to watch IPTVs and order merchandise via the AT&T® cellular network via PDA phones. In this example, a cellular phone service provider is empowered by the inventive subject matter and benefits from it. Value is created for the cellular phone service providers, and the viewer.

B. Based on viewer B's preferred setting, charge for the merchandise will appear on his next IPTV subscription invoice.

C. Based on viewer B's preferred setting, the advertiser will separately send an invoice to viewer B.

Thus, specific embodiments and applications of a new business model for interactive advertising on video programs to run on television, mobile device, and personal computer have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the invention. In addition, where the specification and claims refer to at least one of something selected from the group consisting of a, b, c . . . . And n, the text should be interpreted as requiring only one element from the group, not a plus n, or b plus n, etc.

What is claimed is:

1. A method of sending a request from a viewer to a third party advertiser via a broadcaster, in response to an advertisement transmitted by the broadcaster, while the viewer is watching the advertisement on a screen, the method comprising:

using a client system to display the advertisement on the screen, wherein the client system is defined as a system having at least the screen and a viewer's controller to the screen; and after the viewer gives a command to the client system, using the client system to send the request along with an identifier of the viewer to a server system of the broadcaster, wherein the command is initiated by a physical act of the viewer where the viewer selectively presses at least one key on the controller, and where the viewer does not key in his contact information;

the broadcaster receives the request and retrieves additional information about the viewer previously stored in the server system, as identified by the identifier in the received request, and wherein the additional information includes a contact information of the viewer;

the broadcaster sending the request and the additional information to the third party advertiser to follow up with the viewer; and wherein the broadcaster, the viewer, the advertiser are three separate entities.

2. The method of claim 1 wherein the displaying of advertisement includes transmitting the advertisement over a network, wherein the viewer also views a program content transmitted over the network, the network is selected from a member of the group consisting of the Internet, a satellite network, a cable television network, a cellular phone network, and a mobile communication network.

3. The method of claim 2 wherein the program content is a member of the group consisting of a broadcasted video program, a broadcasted live program, a broadcasted sporting events program, a streamed video program, a third party video advertisement; a user-generated content, a website, a user profile in a social networking website, a video game, an instant messaging user interface, a text message on a mobile device, and an e-mail message on a mobile device, and wherein the broadcaster is a member selected from a group consisting of a host of the network, and a provider of the program content.

4. The method of claim 3 wherein the command is initiated by a physical act of the viewer selected from at least one of the following:

pressing of a key, pressing of a button; and sending the request is completed by no more than two physical acts.

5. The method of claim 3 wherein the request is selected from at least one of a lead, a request to forward the advertisement and a request to save the advertisement; and giving a command by the viewer is completed by no more than one physical act of the viewer.

6. The method of claim 3 wherein the request is an order to purchase an advertised goods or services, wherein the additional information includes a viewer attribute previously saved at the broadcaster's server system and sufficient to fulfill the order to purchase the advertised goods or service.

7. The method of claim 5 wherein the advertisement is a member selected from a group consisting of a banner, an overlaid banner, a bubble, a window, a text message.

8. A method of sending a request from a viewer to a third party advertiser via a broadcaster, in response to an advertisement, while the viewer is watching the advertisement on a close-ended network being displayed on a television screen, the method comprising:

using a client system to display the advertisement, wherein the client system includes at least the television screen and a controller of the client system; and the viewer using the controller of the client system to give a command to the client system, after which the client system sends the request along with an identifier of the viewer to a server system;

the server system receives the request and retrieves additional information about the viewer previously stored at the server system, as identified by the identifier in the received request; and using the server system of the broadcaster to send the request and the additional information to the third party advertiser;

wherein the closed-end network is a network where the viewer of the network does not view the network anonymously to the server, and requires viewer-subscription; and wherein the viewer, the broadcaster, and the third party advertiser are three separate entities.

9. The method as recited in claim 8, wherein the request is a lead, which is defined as an interest in an advertised goods or services, and the request is sent together with contact information of the viewer.

10. The method as recited in claim 9, wherein the controller is a remote control to the television or to a set-top box.

11. The method as recited in claim 8, wherein the request is a request to purchase.

12. The method as recited in claim 11, wherein the additional information contains sufficient information about a viewer's attribute which was previously saved on the broadcaster's server system, allowing the advertiser to fill the request to purchase.

13. The method as recited in claim 8, wherein the request is a request to forward the advertisement.

14. The method as recited in claim 8, wherein the request is a request to save the advertisement.

15. The method as recited in claim 9, further comprising a second request, wherein the second request is a request to display more information.

16. The method as recited in claim 8, wherein the advertisement is a member selected from the group consisting of a banner, an overlaid banner, a bubble, and a window.

17. A method of sending a lead to a third party advertiser whose advertisement is transmitted over a network via a host of the network, and connecting the third party advertiser with a viewer, the method comprising:

using a client system to display the advertisement on an electronic display, wherein the client system is defined as an electronic system to display contents and advertisements transmitted by the host, the client system includes at least a controller and the electronic display;

the viewer initiates a command on the controller to send a request to the host;

the viewer does not key in a contact information before the request is sent by the client system;

wherein, as a result of initiating the command on the controller, the client system does not prompt the viewer to enter a contact information, and the client system sends a request to a server system of the host with an identifier of the viewer;

using the server system to receive the request and retrieve contact information of the viewer previously saved on the server system, and thereafter send a contact information of the viewer to the third party advertiser; and wherein the viewer, the broadcaster, and the third party advertiser are three separate entities separately located at three physical locations distant from each other.

18. The method as recited in claim 17, wherein the third party advertiser contacts the viewer based on the contact information, substantially immediately, or at a later time.

19. The method as recited in claim 18, wherein selecting a command on a controller is the only physical act required of the viewer, to send an identifier of the viewer to the server system.

20. The method as recited in claim 19, wherein the network is a subscription-only network with a software platform, and the display is a television.

21. The method as recited in claim 19, wherein the network is a subscription-only network with a software platform connected to a television, and the electronic display is a television.

22. The method as recited in claim 21, wherein the software platform is in a set-top box connected to the television.

23. The method as recited in claim 19, wherein the network is a satellite television network.

24. The method as recited in claim 19, wherein the network is a cable television network.

25. The method as recited in claim 19, wherein the network is a subscription-only network broadcasted over an Internet.

26. The method as recited in claim 19, wherein the display is a television.

* * * * *